July 10, 1956  C. H. COLLETT  2,754,159

SPLIT SLEEVE

Filed July 18, 1955

INVENTOR
CHARLES H. COLLETT
BY
ATTORNEYS

United States Patent Office 2,754,159
Patented July 10, 1956

2,754,159

SPLIT SLEEVE

Charles H. Collett, Burbank, Calif., assignor to Bettis Rubber Company, a corporation of California Application July 18, 1955, Serial No. 522,668

12 Claims. (Cl. 308—4)

My invention has generally to do with the art of split sleeves and find its first utility as a protective device for drill pipes and the like. This application is a continuation in part of my co-pending application Serial No. 484,495, filed January 27, 1955, now Patent No. 2,739,018, issued March 20, 1956.

In rotary well drilling it is conventional practice to mount a protective sleeve on the drill pipe at one or more points between the members which couple together the lengths of pipe to form a string. The purpose of such protectors is to prevent frictional wearing engagement of the pipe with the well casing or formation and to center the pipe in the drill hole, it being a well known fact that most drill holes, particularly where they extend to the great depths prevalent in oil well drilling, are quite crooked.

Because drill pipe undergoes some reduction in its original diameter, due either to wear or axial stretch, it has heretofore been practically impossible to satisfactorily use any type of protector other than a unitary elastic rubber sleeve capable of being radially stretched and expanded to mount them on the pipe. Such an elastic sleeve will of course contract by reason of its elasticity in order to compensate for reduction in diameter of the pipe. However, to install such elastic rubber protectors on the pipe requires the use of bulky and costly machinery and considerable time since they must be applied axially over the end of the pipe. Also, it is impossible to remove such sleeves from the pipe without destroying them.

Attempts have been made to provide metallic split sleeves for the purpose but those attempts have been unsuccessful for the reason that the split sleeves heretofore provided have not been capable of resiliently constricting about the pipe in a way automatically to compensate for reduction in the original diameter of the pipe. Moreover, such split sleeves as have been provided have necessarily been assembled on the pipe in such a manner that when the pipe undergoes any reduction in diameter the split sleeve slides downwardly along the pipe until it abuts a coupling member and the segments of the sleeve then become loose and often separate, falling into the drill hole and necessitating an expensive fishing operation.

In my said co-pending application I have disclosed a split sleeve which is capable of resiliently, firmly constricting about the pipe in a manner effectively to prevent rotation or axial slippage relative to the pipe despite reduction in diameter of the pipe, the split sleeve consisting of segments made of such material and being so constructed as automatically to compensate for any reduction in diameter of the pipe. In the main, this result is accomplished by making the segments of spring-tempered metal each curved in cross-section, about a radius smaller than that of the periphery of the drill pipe, in excess of 180°, the segments having side edge portions which interengage with each other at least to the extent that the respective segments exceed 180° in curvature.

My present application is directed more particularly to the relative proportions of the interengaging portions of the segments and my present invention has as its principal object the provision of a split sleeve wherein the interengaging portions are so proportioned and disposed as to evenly distribute the gripping action of the interengaging portions of the segments.

I shall point out in the appended claims the features which I believe to be new, but for the purpose of explaining rather than limiting my invention, I shall now describe particular presently preferred embodiments thereof for which purpose I shall refer to the accompanying drawings wherein Fig. 1 is a side elevation view of a split sleeve embodying my invention;

Figure 1:
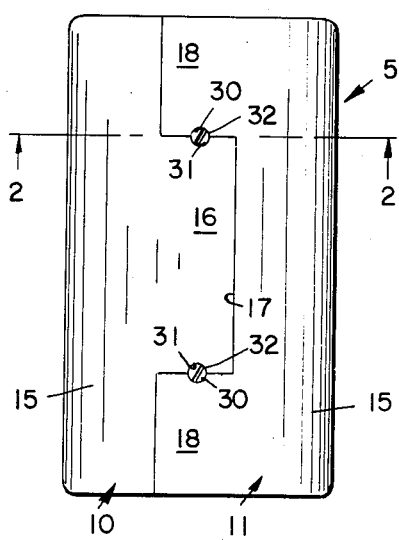
Figure 2:
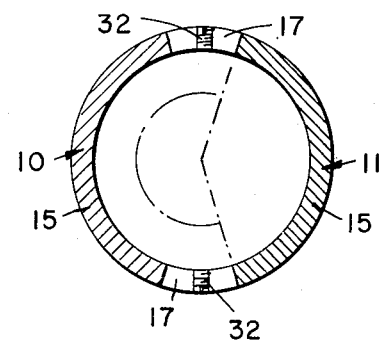
Fig. 2 is a section taken on line 2—2 of Fig. 1.
Figure 3:
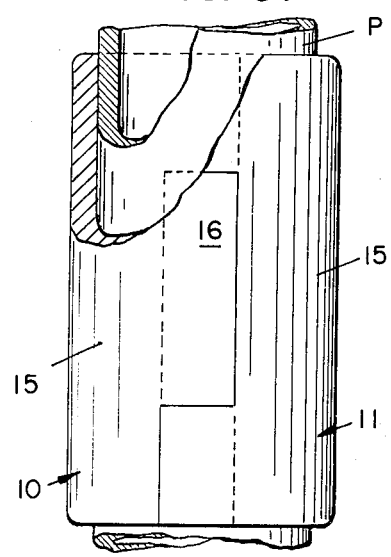
Fig. 3 is a side elevation, with part broken away, showing the sleeve mounted on a pipe.

Referring first to the embodiment shown in Figs. 1–3 of the drawing, I show my split sleeve, generally denoted 5, mounted on a conventional drill pipe P.

The split sleeve comprises two segments 10—11 of equal axial length, mounted on the pipe P in opposed interengaging relationship. Each segment is preferably made of steel, heat treated to spring temper, and comprises a semicircular body portion 15, one of whose side edge portions presents an integral, circumferentially extending tongue 16, and whose opposite side edge portion presents a circumferentially opening slot 17. The slot 17 of one segment receives the tongue 16 of the other segment.

The combined curvature of the body and tongue portion of each segment exceeds 180° in curvature and should have a radius of curvature less than that of the periphery of the pipe upon which it is to be mounted. That is, the said combined curvature should not be in excess of 215°, it being my preference that said combined curvature be of the order of 210°. For a conventional oil well drill pipe having an outside diameter of 4", the radius of curvature of each segment should be 1/16" smaller than that of the periphery of the pipe. Where the pipe or member onto which the sleeve is to fit is of substantially smaller outside diameter however, this radius differential may be as small as 1/32".

The depth of the slot 17 must be at least equal to the extent to which each segment exceeds 180° in curvature, so that the assembled segments form a sleeve of 360° curvature. Also, the entrance portion of the slot must be not smaller in axial length than the axial length of the leading or outer side edge portion of the tongue, so that the tongue may be inserted in the slot without having to be flexed radially beyond the peripheral surface of the outer edge portions 18 of the other sleeve bounding the ends of the slot.

So as to equally distribute the gripping force of the interengaging portions of the segments, I provide each slot 17 medially between the ends of the segment and make the slot of such axial length that portions 18 of the segment, which bound the ends of the slot, are equal to each other in axial length and each portion 18 is of an axial length substantially equal to one-fourth the axial length of the segment. Also, the tongue 16 should be of an axial length and circumferential extent substantially conforming to the slot and should have an axial length equal substantially to one-half the axial length of the segment—that is, the tongue should have an axial length equal to the combined axial lengths of the slot-bounding portions 18. Consequently, the interengaging portions of the respective segments are of substantially equal area. However, my invention contemplates such slight variations in these relative axial lengths as may be employed to provide a loose fit of the tongue portion 16 in the slot 17.

Preferably the end portions of the tongue and the end walls of the slot should be in substantial parallelism and I may provide mating semicircular recesses 30, 31 in the respective end walls of the slot and the contiguous end surfaces of the tongue, which recesses are threaded to receive a locking screw 32 to prevent circumferential separation of the segments. While I show such locking means at each end of the slot, I may provide the same only at one end of the slot.

While it is preferable that both side edge portions of each segment interengage with both side edge portions of the other segment, I may eliminate the interengaging portions at one side of the sleeve.

Figure 4:
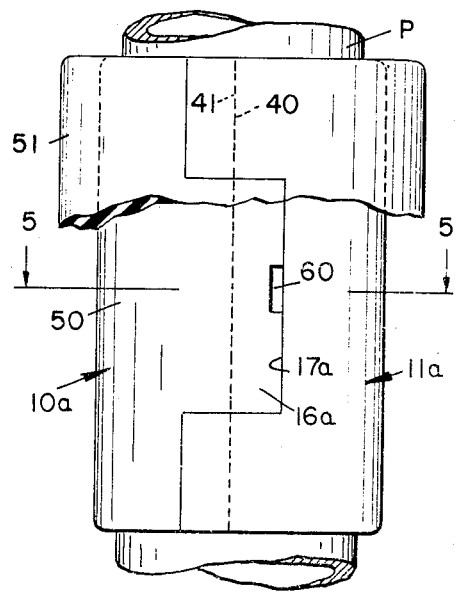
Fig. 4 is a side elevation showing a modified form of split sleeve.
Figure 5:
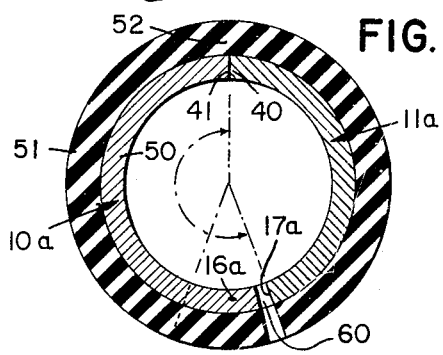
Fig. 5 is a section taken on line 5—5 of Fig. 4.

For instance, in Figs. 4 and 5 I show a variational form of split sleeve in which each of the segments 10a, 11a has one straight uninterrupted side edge portions 40, 41, which side edge portions preferably abut each other, while the opposite side edge portion of one of the segments has the circumferentially opening slot 17a, before described, and the opposite side edge portion of the other segment has the tongue extension 16a, before described, engaging in the slot.

Each of those segments 10a, 11a has a metallic inner or lining portion 50 and carries an outer covering 51 of soft resilient rubber bonded to the outer surface of portion 50. Preferably the rubber covering extends over the abutting side edge portions 40, 41 of the segments at 52 so as to form a hinge therefor to permit them to swing relative to each other in being mounted on or removed from a pipe.

To facilitate circumferential separation of the segments, for the purpose of removing them from the pipe, I may provide in the outer edge portion of the tongue member a recess 60 to receive a suitable separating tool, not shown.

To mount the segments on a pipe they are placed thereon in opposed relationship and then forced together by a suitable tool, not shown. The resiliency of the segments permits their interengaged portions to spring over the pipe, and the relatively small radius of curvature of the segments in relation to the periphery of the pipe causes the segments to resiliently, firmly grip the pipe and to constrict thereabout and remain in their original position on the pipe even though the pipe may undergo reduction in diameter.

While I have described the segments comprising my split sleeve as being made of spring-tempered metal, I do not wish to exclude the possibility of using any equivalent material having the characteristics described. For instance, there may be plastics having such characteristics.

However, where metal is used for forming my segments, I have found it highly advantageous to form them of a length of tubing having a radius of curvature smaller than the radius of curvature of the periphery of the pipe or member onto which the sleeve is to be mounted. I first heat treat the length of tubing to a spring temper, after which I flame cut the tubing to separate it into segments having the described interengaging side edge portions. I find that this method of manufacture retains the true curvature of the segments and insures the full advantages of the relatively smaller radius. If the tubing were cut before heat treating, in the course of the heat treatment the segments would tend to flatten out and lose their true original curvature.

I claim:

1. In a split sleeve for embracing a cylindrical member, a pair of opposed, interengaging, resilient segments each curved in cross-section about a radius smaller than the radius of curvature of the periphery of said member and extending in excess of 180°, one of the side edge portions of the first of said segments being interrupted medially between its ends by a circumferentially disposed slot presenting an entrance portion opening towards the contiguous side edge portion of the second of said segments and the contiguous side edge portion of said second of said segments having medially between its ends a circumferentially extending slot-engaging tongue portion presenting a leading portion having an axial length not greater than the axial length of said entrance portion of said slot; the axial length of said tongue portion being substantially equal to the combined axial length of those portions of the said first segment bounding the ends of said slot.

2. The device of claim 1 wherein said slot-engaging tongue portion conforms to the shape of said slot.

3. The device of claim 1 wherein the end surfaces of said tongue portion and the end walls of said slot are in parallelism.

4. In a split sleeve for embracing a cylindrical member, a pair of opposed, interengaging, resilient segments each curved in cross-section about a radius smaller than the radius of curvature of the periphery of said member and extending in excess of 180°, one of the side edge portions of the first of said segments being interrupted medially between its ends by a circumferentially disposed slot presenting an entrance portion opening towards the contiguous side edge portion of the second of said segments and the contiguous side edge portion of said second of said segments having medially between its ends a circumferentially extending slot-engaging tongue portion presenting a leading portion having an axial length not greater than the axial length of said entrance portion of said slot, the area of said tongue portion being substantially equal to the combined area of those portions of said first segment bounding the ends of said slot.

5. The device of claim 4 wherein said slot-engaging tongue portion conforms to the shape of said slot.

6. The device of claim 4 wherein the end surfaces of said tongue portion and the end walls of said slot are in parallelism.

7. In combination with a drill pipe of cylindrical cross-section, a protector disposed about said pipe in embracing relationship thereto, said protector being characterized by its ability to resiliently, snugly embrace said pipe in a manner automatically to compensate for reduction in the original outside diameter of said pipe, and comprising a pair of opposed, interengaging, spring tempered, metallic segments each curved in cross section about a radius smaller than the radius of curvature of the periphery of said pipe; and extending in excess of 180°, one of the side edge portions of the first of said segments having a circumferentially disposed slot presenting an entrance portion opening toward the contiguous side edge portion of the second of said segments, and the said contiguous side edge portion of the said second of said segments having a circumferentially extending, slot-engaging tongue portion presenting a leading portion having an axial length not greater than the axial length of said entrance portion of said slot, the axial length of said tongue portion being equal to the combined axial length of those portions of the first of said segments bounding the ends of said slot.

8. The device of claim 7 wherein said slot-engaging tongue portion conforms to the shape of said slot.

9. The device of claim 7 wherein the end surfaces of said tongue portion and the end walls of said slot are in parallelism.

10. In combination with a drill pipe of cylindrical cross-section, a protector disposed about said pipe in embracing relationship thereto, said protector being characterized by its ability to resiliently, snugly embrace said pipe in a manner automatically to compensate for reduction in the original outside diameter of said pipe, and comprising a pair of opposed, interengaging, spring tempered, metallic segments each curved in cross-section about a radius smaller than the radius of curvature of the periphery of said pipe; and extending in excess of 180°, one of the side edge portions of the first of said segments having a circumferentially disposed slot presenting an entrance portion opening toward the contiguous side edge portion of the second of said segments, and the said contiguous side edge portion of the said second of said segments having a circumferentially extending, slot-engaging tongue portion presenting a leading portion having an axial length not greater than the axial length of said entrance portion of said slot, the area of said tongue portion being equal to the combined area of those portions of the first of said segments bounding the ends of said slot.

11. The device of claim 10 wherein said slot-engaging tongue portion conforms in shape to the shape of said slot.

12. The device of claim 10 wherein the end surfaces of said tongue portion and the end walls of said slot are in parallelism.

References Cited in the file of this patent
UNITED STATES PATENTS

| | | |
|---|---|---|
| Re. 22,156 | Morris | Aug. 4, 1942 |
| 1,213,684 | Osterholm | Jan. 23, 1917 |
| 1,613,039 | McLaren | Jan. 4, 1927 |
| 2,594,587 | Riordan | Apr. 29, 1952 |